US012780338B2

(12) United States Patent
Cho

(10) Patent No.: US 12,780,338 B2
(45) Date of Patent: Nov. 3, 2026

(54) MOVING PART SWITCHABLE BETWEEN LEG MODE AND WHEEL MODE AND HYBRID ROBOT HAVING THEREOF

(71) Applicant: Kookmin University Industry Academy Cooperation Foundation, Seoul (KR)

(72) Inventor: Baek Kyu Cho, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 332 days.

(21) Appl. No.: 18/293,510

(22) PCT Filed: Jul. 29, 2022

(86) PCT No.: PCT/KR2022/011185
§ 371 (c)(1),
(2) Date: Jan. 30, 2024

(87) PCT Pub. No.: WO2023/008947
PCT Pub. Date: Feb. 2, 2023

(65) Prior Publication Data
US 2024/0336313 A1 Oct. 10, 2024

(30) Foreign Application Priority Data
Jul. 30, 2021 (KR) ........................ 10-2021-0100793
Jul. 28, 2022 (KR) ........................ 10-2022-0093721

(51) Int. Cl.
*B62D 57/028* (2006.01)
*B60G 17/015* (2006.01)
*B62D 57/032* (2006.01)

(52) U.S. Cl.
CPC ......... *B62D 57/028* (2013.01); *B60G 17/015* (2013.01); *B62D 57/032* (2013.01)

(58) Field of Classification Search
CPC .. B62D 57/028; B62D 57/032; B60G 17/015; B25J 11/008
See application file for complete search history.

(56) References Cited

U.S. PATENT DOCUMENTS 6,422,329 B1 7/2002 Kazerooni et al.

FOREIGN PATENT DOCUMENTS

CN 206171601 U 5/2017
CN 111497965 A 8/2020
(Continued)

OTHER PUBLICATIONS

Extended European Search Report dated Jun. 18, 2025, issued in European Application No. 22849922.4.
(Continued)

*Primary Examiner* — Drew J Brown
(74) *Attorney, Agent, or Firm* — Sughrue Mion, PLLC

(57) ABSTRACT

Disclosed are a moving part switchable in a leg mode and a wheel mode and thus capable of moving stably over various terrains by switching to a leg mode or a wheel mode as needed; and a hybrid robot having the moving part. More particularly, the hybrid robot switchable in a leg mode and a wheel mode includes a main body; and a moving part movable in a state of being rotated in at least one direction of roll, pitch, and yaw directions by a motor mounted on the main body, wherein the moving part includes: a first link rotatably connected to the main body through a portion between one side of the first link and another side thereof; second links located below the first link and configured to rotate in an identical direction in conjunction with rotation of the first link; a joint motion means connected to one side of each of the first and second links; and a wheel motion means connected to another side of each of the first and second links, wherein the moving part operates together (Continued)

with the motor mounted on the main body, the moving part is operated by the joint motion means in the leg mode, and the moving part is operated by the wheel motion means in the wheel mode.

24 Claims, 19 Drawing Sheets

(56) References Cited

FOREIGN PATENT DOCUMENTS

| | | | | | |
|---|---|---|---|---|---|
| CN | 111516773 | A | * | 8/2020 | B62D 57/032 |
| CN | 111687880 | A | * | 9/2020 | B25J 17/02 |
| CN | 111820114 | A | | 10/2020 | |
| CN | 112519913 | A | * | 3/2021 | B62D 57/028 |
| CN | 112590964 | A | * | 4/2021 | B62D 57/028 |
| CN | 112590966 | A | * | 4/2021 | B62D 57/028 |
| CN | 109501880 | B | | 7/2021 | |
| CN | 113511282 | A | * | 10/2021 | B62D 57/032 |
| CN | 120156618 | A | * | 6/2025 | B60P 3/20 |
| CN | 120246119 | A | * | 7/2025 | B62D 57/032 |
| CN | 120308234 | A | * | 7/2025 | B62D 57/028 |
| CN | 120792996 | A | * | 10/2025 | B60K 1/00 |
| CN | 121043111 | A | * | 12/2025 | B25J 5/00 |
| JP | 7037706 | B2 | | 3/2022 | |
| KR | 10-2008-0086287 | A | | 9/2008 | |
| KR | 10-2009-0066950 | A | | 6/2009 | |
| KR | 10-2009-0126690 | A | | 12/2009 | |
| KR | 10-2019-0123679 | A | | 11/2019 | |
| KR | 10-2020-0010936 | A | | 1/2020 | |
| KR | 10-2020-0049117 | A | | 5/2020 | |
| KR | 10-2252588 | B1 | | 5/2021 | |

OTHER PUBLICATIONS

International Search Report of PCT/KR2022/011185 dated Nov. 3, 2022 [PCT/ISA/210].

* cited by examiner

【FIG. 1】
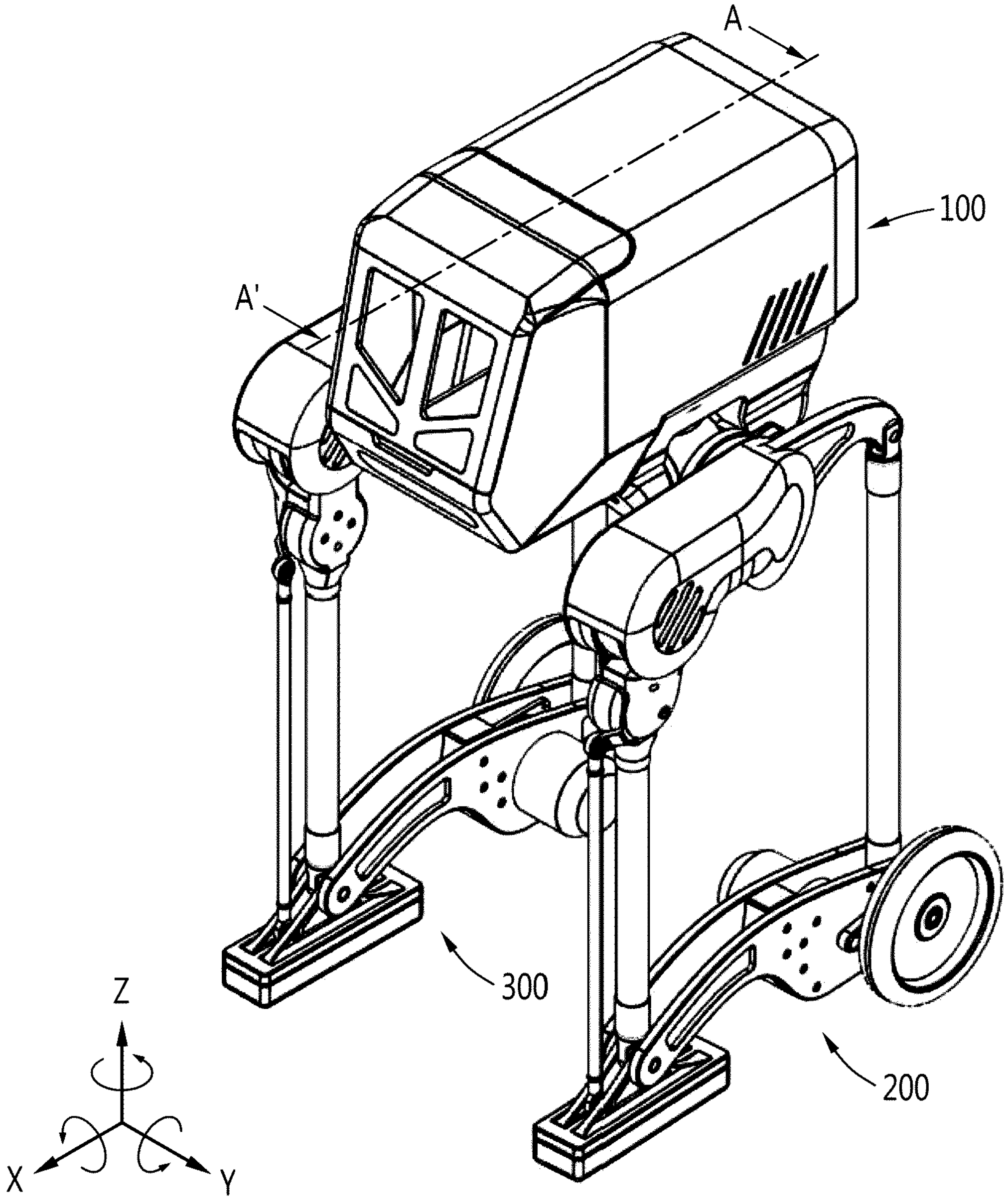

【FIG. 2】
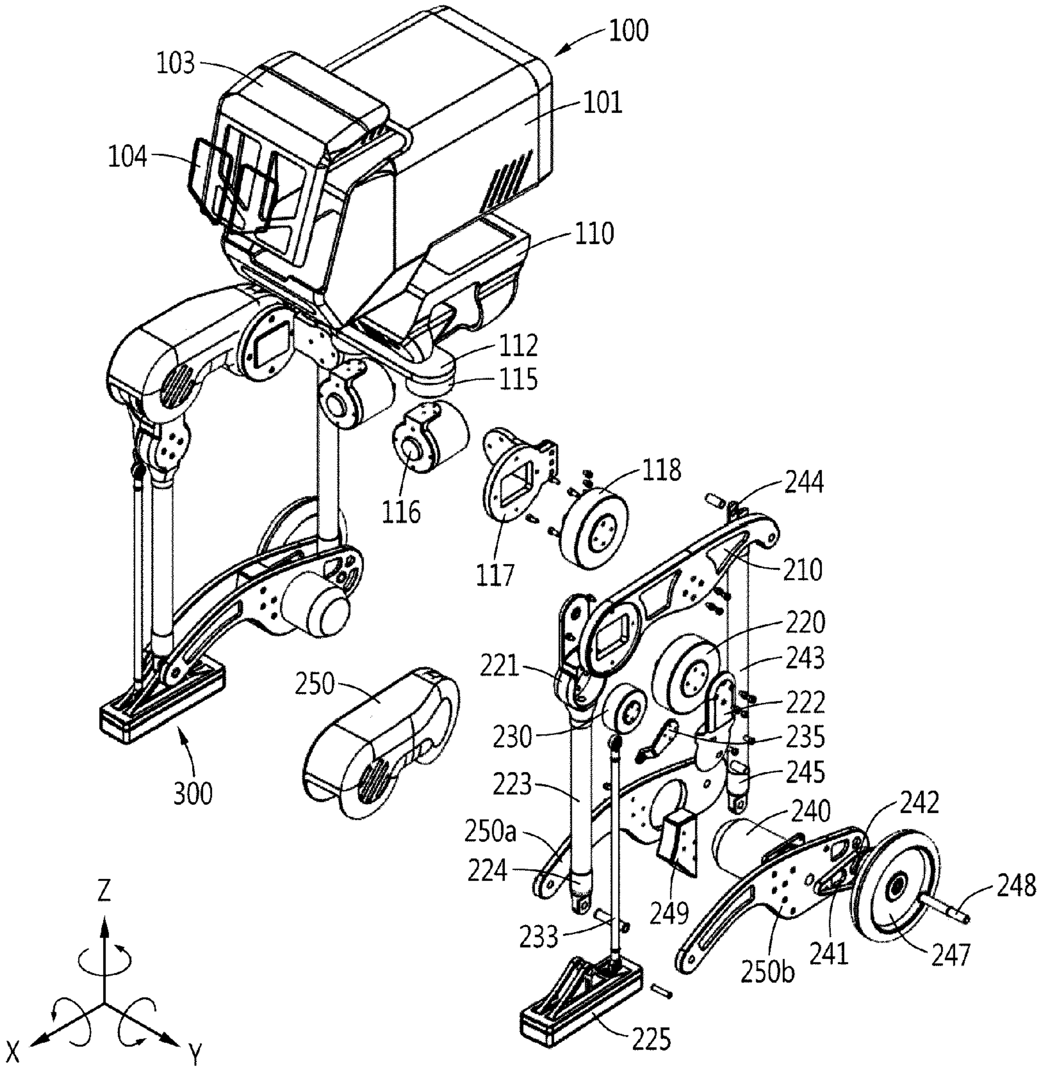

【FIG. 3】
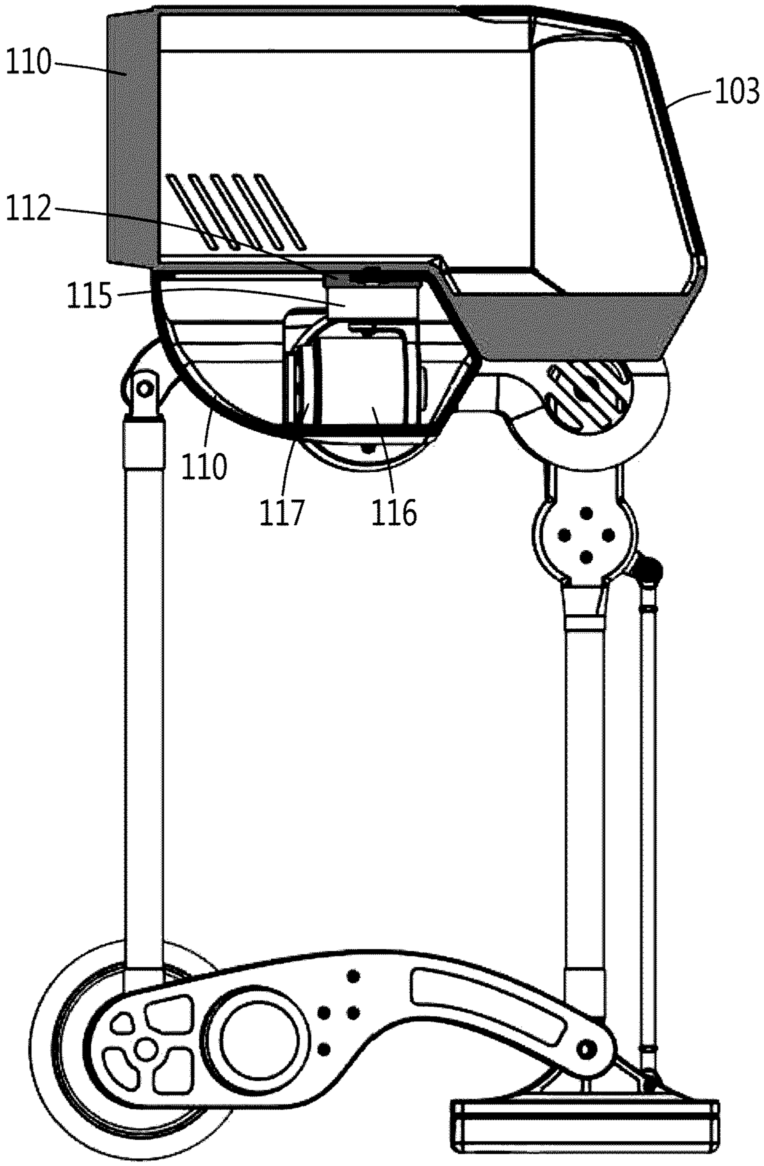

【FIG. 4】
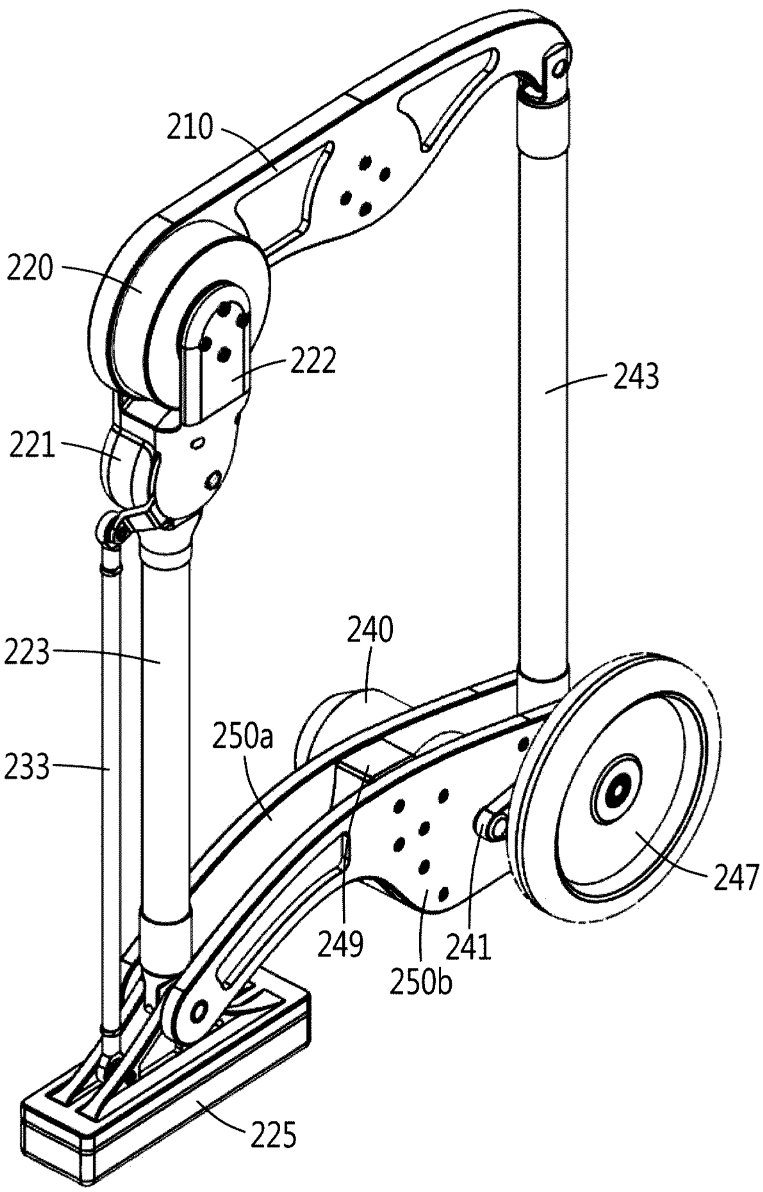

【FIG. 5】
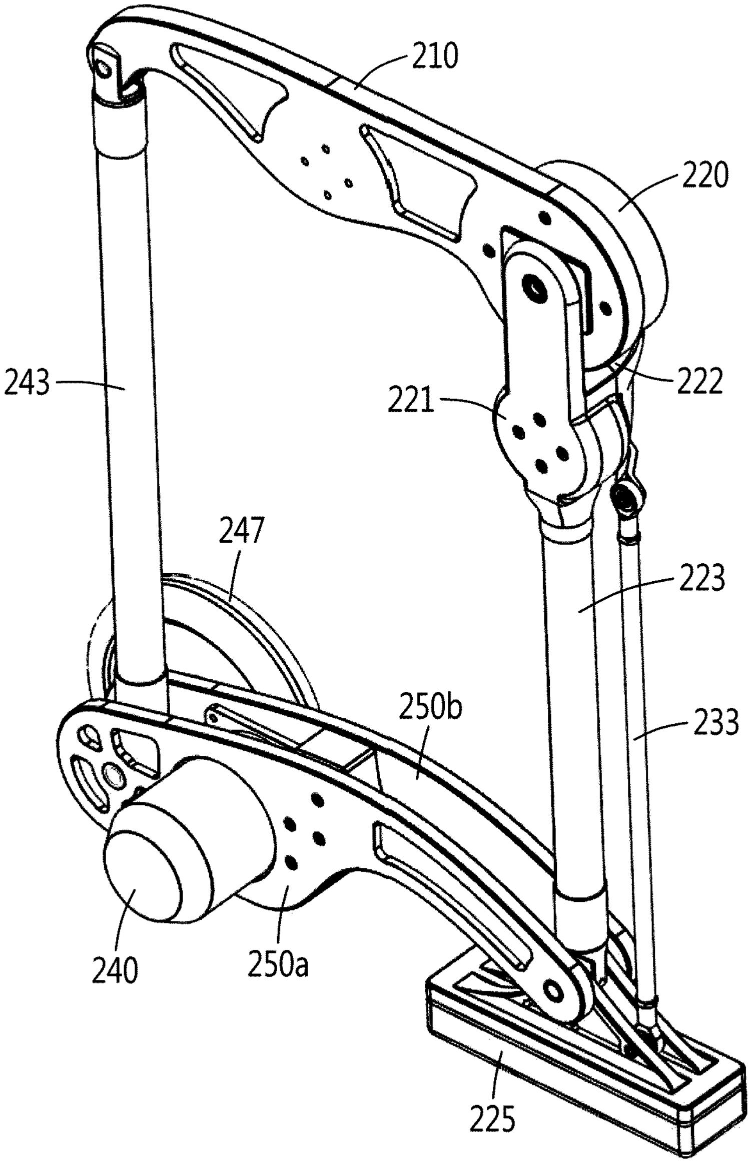

【FIG. 6】
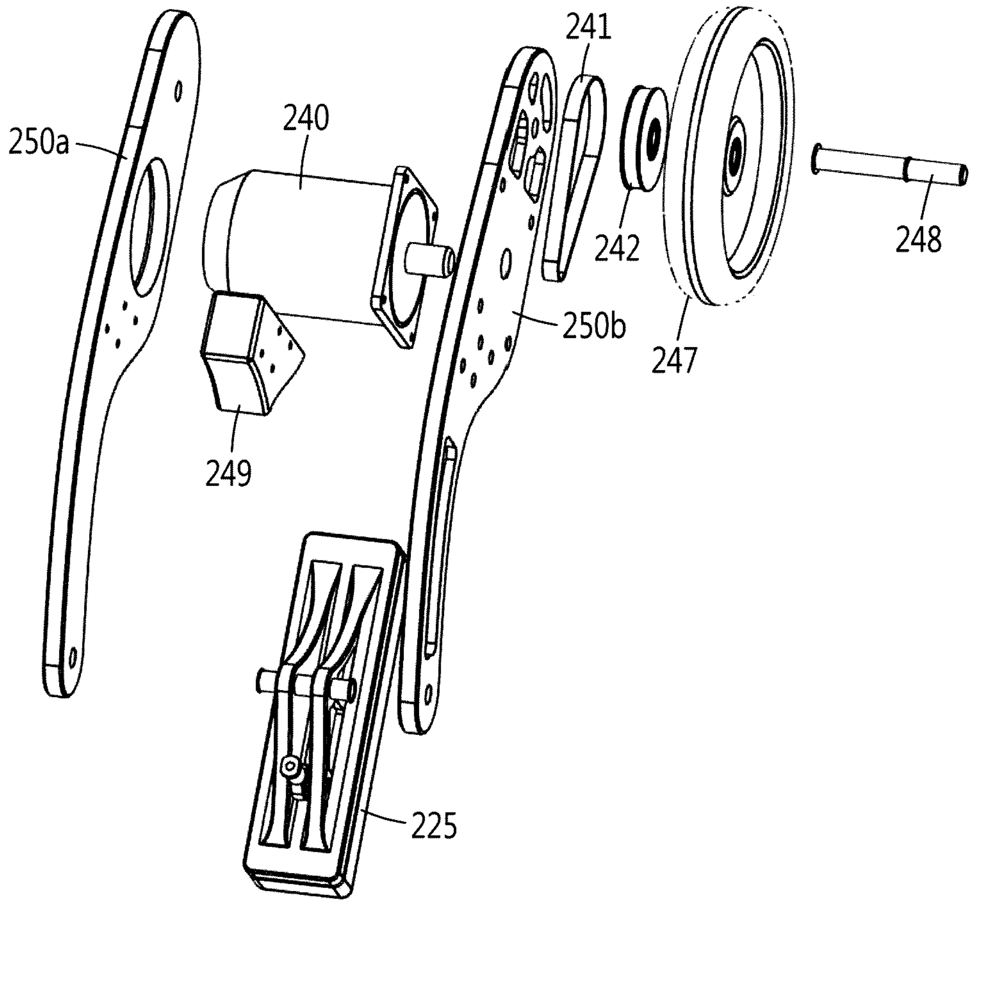

【FIG. 7】
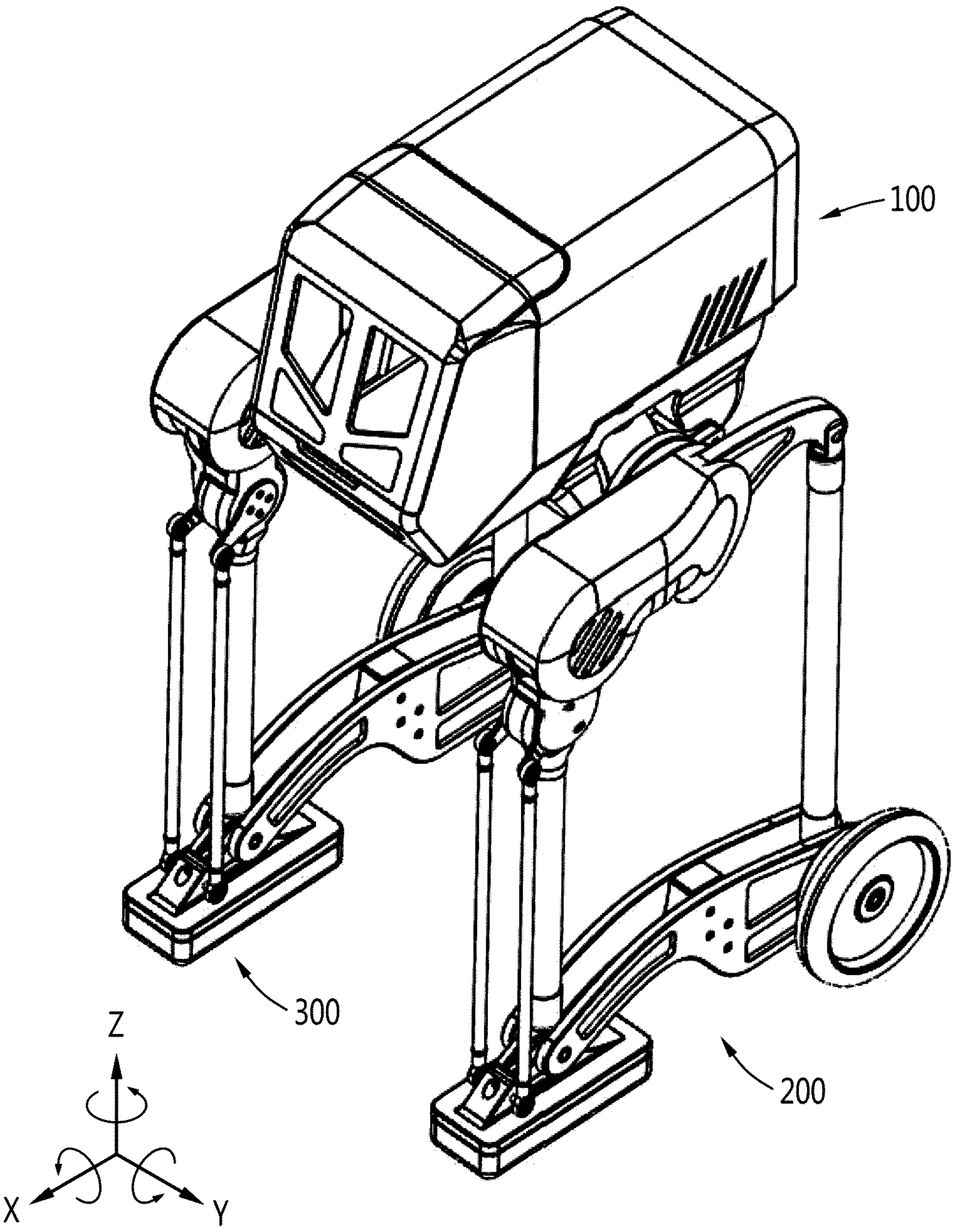

【FIG. 8】
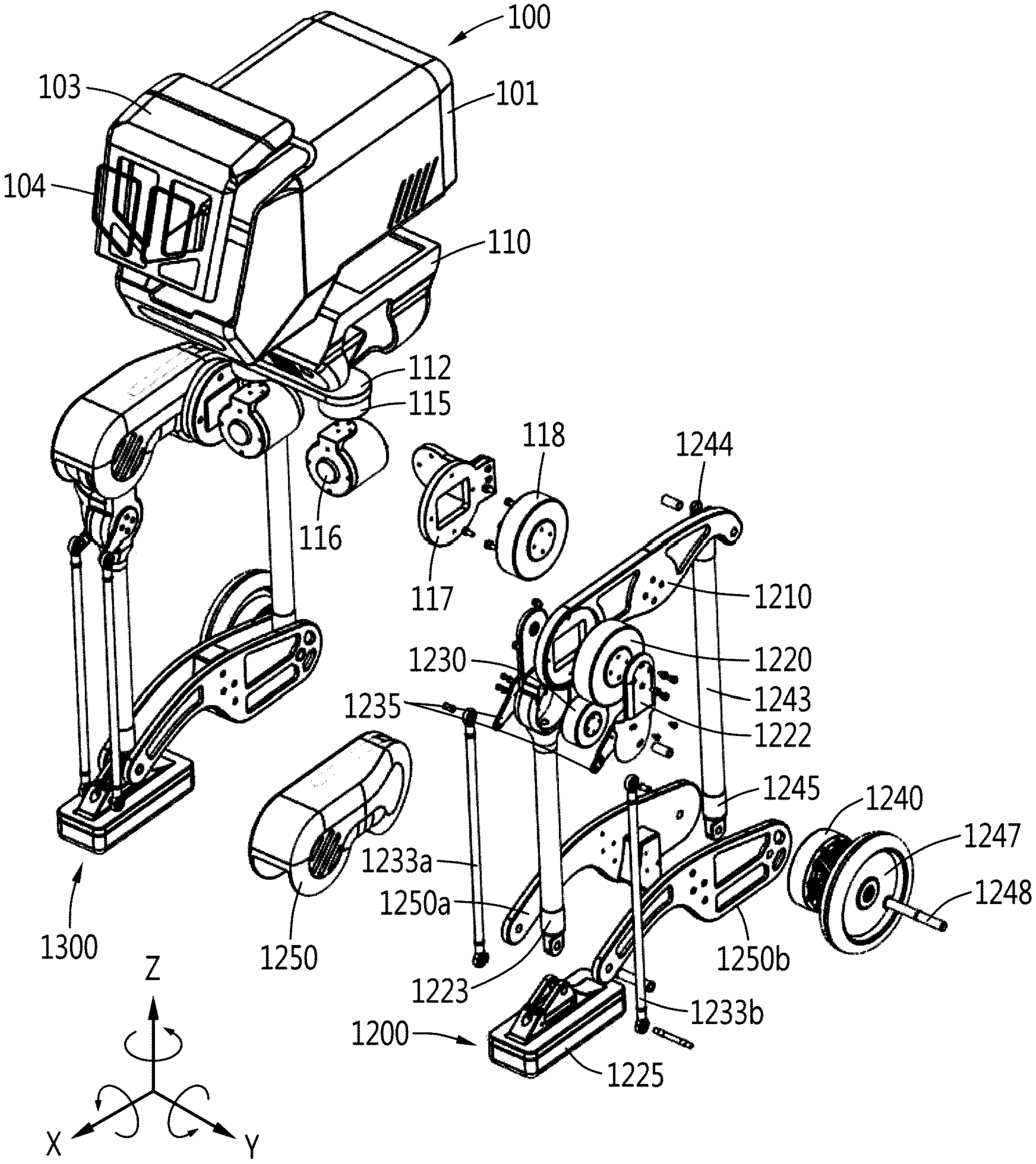

【FIG. 9】
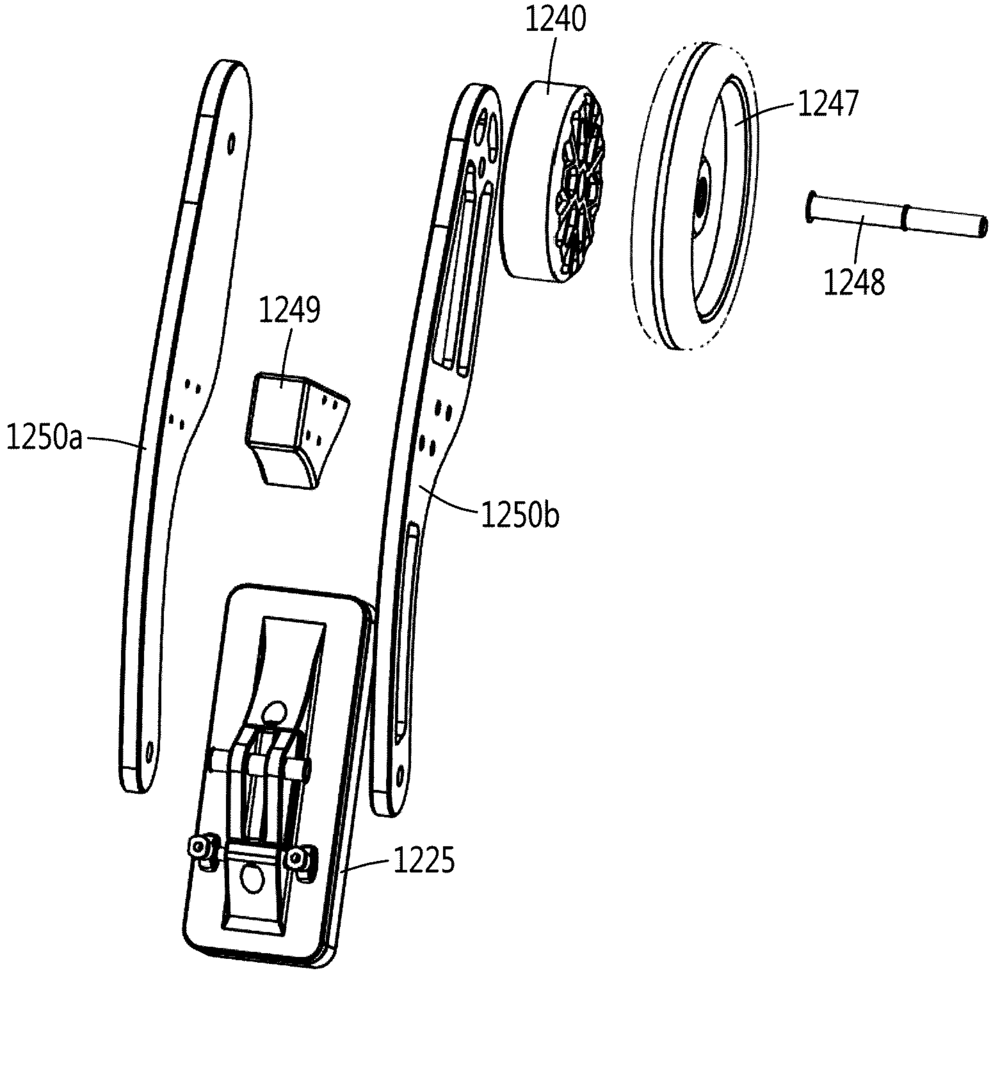

【FIG. 10a】

【FIG. 10b】

【FIG. 10c】

【FIG. 11】

【FIG. 12a】
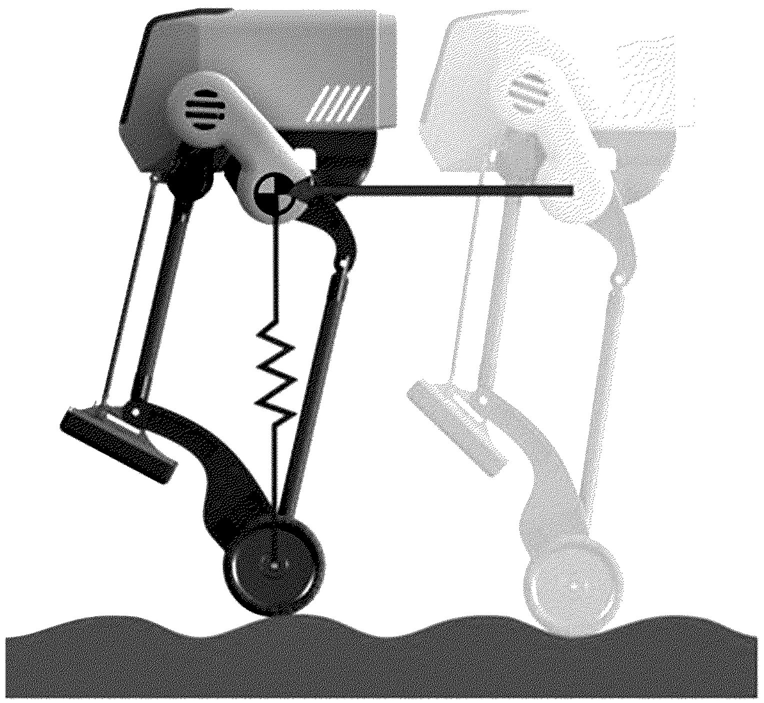

【FIG. 12b】
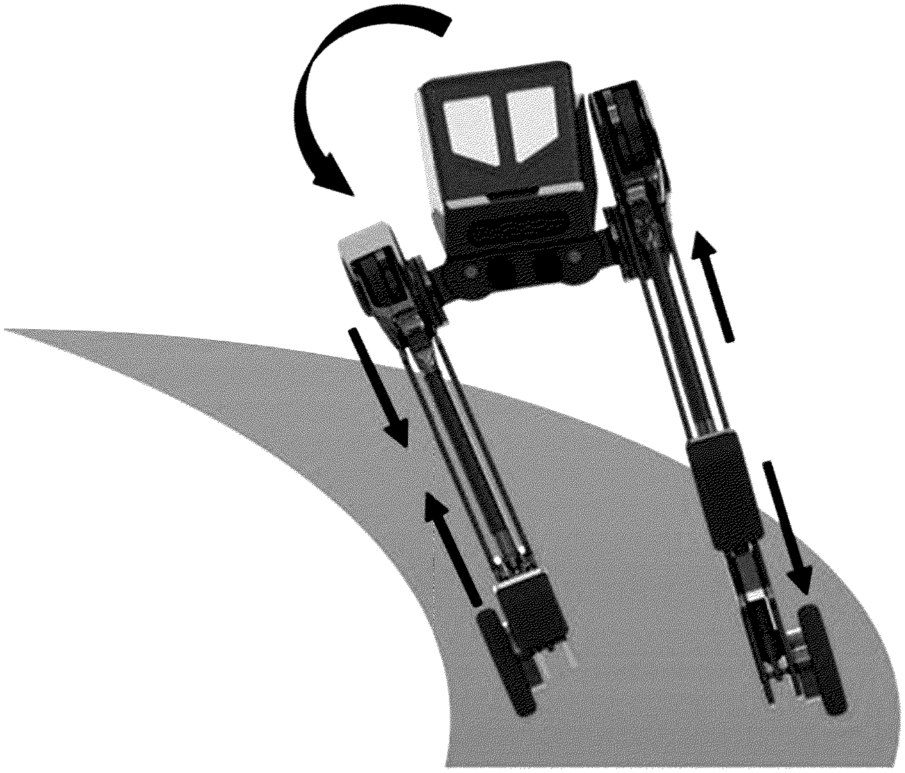

【FIG. 12c】

【FIG. 12d】
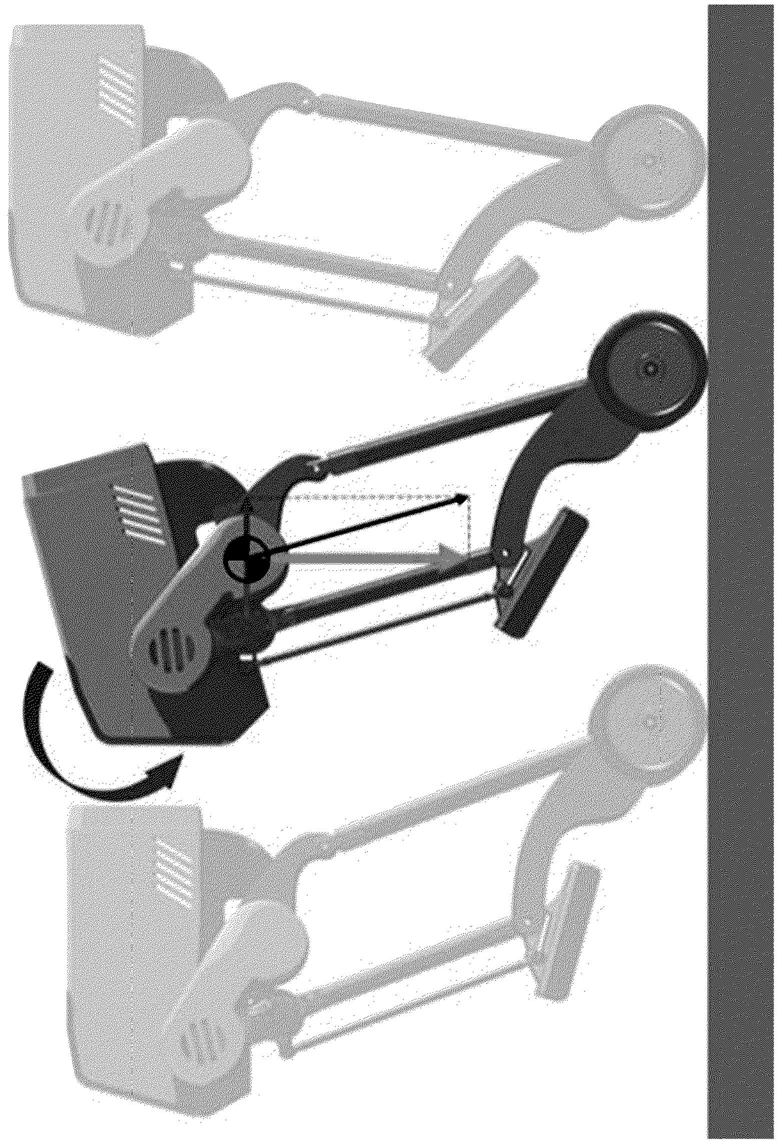

【FIG. 12e】
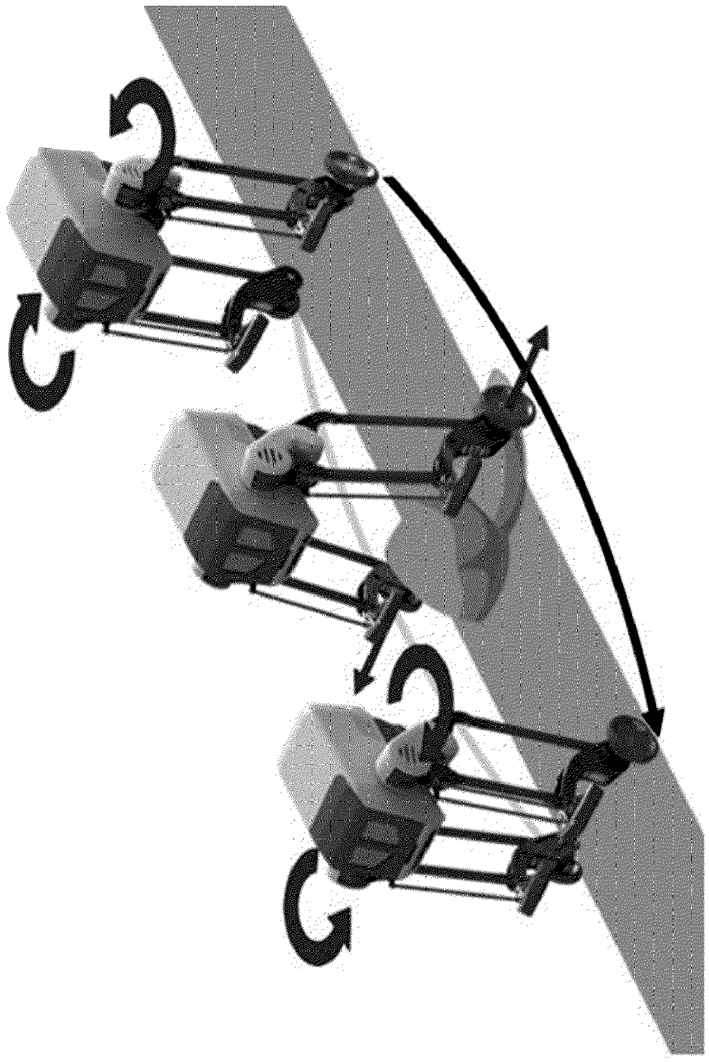

【FIG.13】
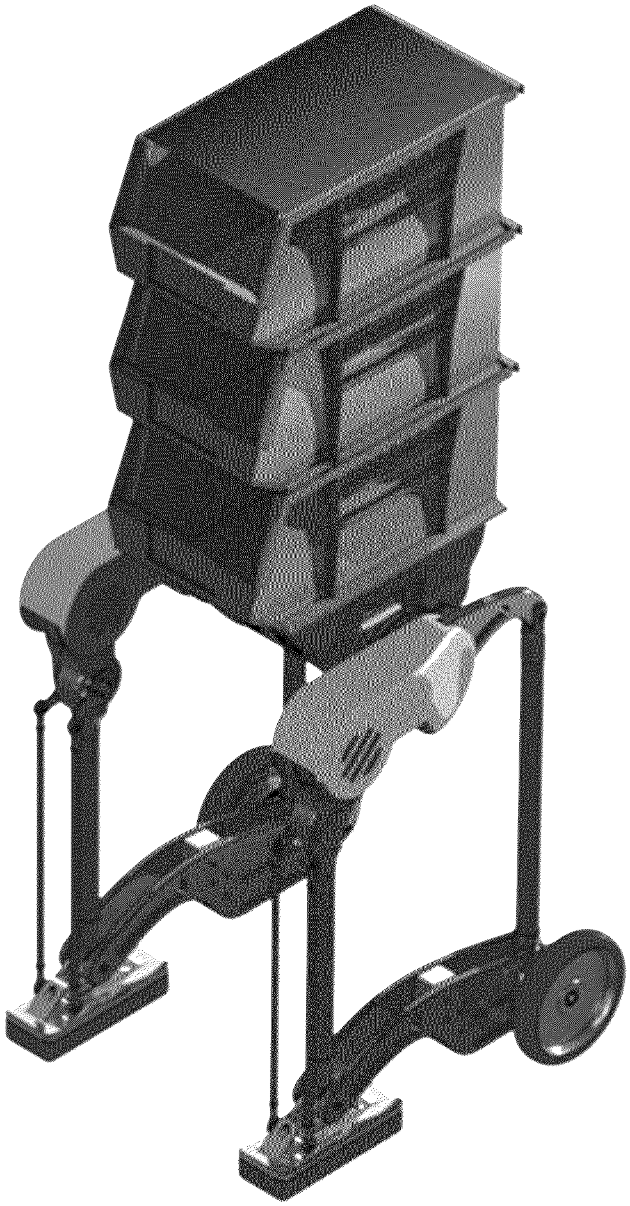

MOVING PART SWITCHABLE BETWEEN LEG MODE AND WHEEL MODE AND HYBRID ROBOT HAVING THEREOF

CROSS REFERENCE TO RELATED APPLICATIONS

This application is a National Stage of International Application No. PCT/KR2022/011185 filed on Jul. 29, 2022, claiming priority based on Korean Patent Application No. 10-2021-0100793 filed on Jul. 30, 2021 and Korean Patent Application No. 10-2022-0093721 filed on Jul. 28, 2022.

TECHNICAL FIELD

The present invention relates to a moving part switchable in a leg mode and a wheel mode and a hybrid robot having the same, and more particularly to a moving part switchable in a leg mode and a wheel mode to move stably over various terrains by switching to a leg mode or a wheel mode as needed and a hybrid robot having the moving part.

BACKGROUND ART

A robot is a machine that automatically handles given tasks using its own capabilities or operates according to manipulation. Recently, the field of application of robots has expanded. Industrial robots, medical robots, and aerospace robots have been developed, and household robots that can be used in general homes are also being created. Among these robots, those that can travel on their own are called mobile robots.

Due to various social factors such as the development of science and technology, COVID-19, population aging, and population reduction, the need for mobile robots to assist humans and perform various roles is increasing.

Currently, Segway-type mobile robots or wheeled mobile robots using omni-wheels have been developed and are being used in various fields. These wheeled mobile robots have the advantage of faster movement speed than legged mobile robots, but they can only be used on flat terrain and are difficult to use in terrain such as stairs where wheels are difficult to move. Meanwhile, among legged mobile robots, humanoid robots and four-legged robots can move in various terrains, but their movement speed is slower than wheeled mobile robots.

Therefore, there is a need to develop mobile robots that can move across various terrains while increasing movement speed.

DISCLOSURE

Technical Problem

Therefore, the present invention has been made in view of the above problems, and it is one object of the present invention to provide a moving part for a hybrid robot switchable in a leg mode and a wheel mode, the moving part allowing to move across various terrains at high speeds, considering a robot's dynamic behavior for acceleration and deceleration and being capable of switching to a leg/wheel mode that allows the robot to move stably even under irregular terrain conditions.

Technical Solution

In accordance with an aspect of the present invention, the above and other objects can be accomplished by the provision of a hybrid robot switchable in a leg mode and a wheel mode, the hybrid robot including: a main body; and a moving part movable in a state of being rotated in at least one direction of roll, pitch, and yaw directions by a motor mounted on the main body, wherein the moving part includes: a first link rotatably connected to the main body through a portion between one side of the first link and another side thereof; second links located below the first link and configured to rotate in an identical direction in conjunction with rotation of the first link; a joint motion means connected to one side of each of the first and second links; and a wheel motion means connected to another side of each of the first and second links, wherein the moving part operates together with the motor mounted on the main body, the moving part is operated by the joint motion means in the leg mode, and the moving part is operated by the wheel motion means in the wheel mode.

Preferably, the main body may include: yaw motors; a roll motor mounted on a rotation part of each of the yaw motors; and a pitch motor mounted on a rotation part of the roll motor and configured to rotate the first link.

In addition, preferably, a frame for fixing the yaw motors may be mounted on the main body.

In addition, preferably, the pitch motor may be connected to the roll motor by a motor bracket so as to have a pitch direction rotation axis.

In addition, preferably, the joint motion means may include: a first joint driving motor mounted on one side of the first link; link mount parts connected to be rotated by the first joint driving motor; a first joint motion rod whose one end is fixedly connected to the link mount parts and whose other end is rotatably connected to one side of the second links; and a foot rotatably connected to another end of the first joint motion rod.

In addition, preferably, the first joint motion rod and the foot may have an identical central axis and may be connected to one side of the first link.

In addition, preferably, the joint motion means may further include: a second joint driving motor mounted on the link mount; a third link connected to be rotated by the second joint driving motor; and a second joint motion rod whose one end is rotatably connected to the third link and whose other end is rotatably connected to the foot.

In addition, preferably, the first joint motion rod may be connected to a first point of the foot, and the second joint motion rod may be connected to a second point, located a certain distance away from the first point, of the foot.

In addition, preferably, the wheel motion means may include: a wheel motion rod whose opposite ends are rotatably connected to other ends of the first and second links; a wheel rotatably connected to other ends of the second links; and a wheel-driving motor for driving the wheel.

In addition, preferably, the wheel motion rod and the wheel may have an identical central axis and may be connected to other ends of the second links.

In addition, preferably, the wheel motion means may further include: a pulley fixed to the wheel; and a belt connected to the pulley and configured to be rotated by the wheel-driving motor.

In addition, preferably, the wheel-driving motor and the wheel may have an identical central axis and the wheel-driving motor may be mounted on the wheel.

In addition, preferably, two second links may be included in a posture facing each other, and a spacer may be mounted between the second links.

In addition, preferably, in the station mode, the first and second links may be rotated parallel to ground such that the moving part is stationary.

In accordance with another aspect of the present invention, there is provided a moving part for a hybrid robot switchable in a leg mode and a wheel mode, the moving part includes: a first link; second links located below the first link and configured to rotate in an identical direction in conjunction with rotation of the first link; a joint motion means connected to one side of each of the first and second links; and a wheel motion means connected to another side of each of the first and second links, wherein the moving part is operated by the joint motion means in the leg mode, and the moving part is operated by the wheel motion means in the wheel mode.

In addition, preferably, the joint motion means may include: a first joint driving motor mounted on one side of the first link; link mount parts connected to be rotated by the first joint driving motor; a first joint motion rod whose one end is fixedly connected to the link mount parts and whose other end is rotatably connected to one side of the second links; and a foot rotatably connected to another end of the first joint motion rod.

In addition, preferably, the first joint motion rod and the foot may have an identical central axis and may be connected to one side of the first link.

In addition, preferably, the joint motion means may further include: a second joint driving motor mounted on the link mount; a third link connected to be rotated by the second joint driving motor; and two second joint motion rods, wherein one end of each of the second joint motion rods is rotatably connected to the third link and another end thereof is rotatably connected to the foot.

In addition, preferably, the first joint motion rod may be connected to a first point of the foot, and the second joint motion rod may be connected to a second point, located a certain distance away from the first point, of the foot.

In addition, preferably, the second joint motion rods may be formed on opposite sides of the first joint motion rod so that the first joint motion rod is placed between the second joint motion rods.

In addition, preferably, the wheel motion means may include: a wheel motion rod whose opposite ends are rotatably connected to other ends of the first and second links; a wheel rotatably connected to other ends of the second links; and a wheel-driving motor for driving the wheel.

In addition, preferably, the wheel motion rod and the wheel may have an identical central axis and may be connected to other ends of the second links.

In addition, preferably, the wheel motion means may further include: a pulley fixed to the wheel; and a belt connected to the pulley and configured to be rotated by the wheel-driving motor.

In addition, preferably, the wheel-driving motor and the wheel may have an identical central axis and the wheel-driving motor may be mounted on the wheel.

In addition, preferably, two second links may be included in a posture facing each other, and a spacer may be mounted between the second links.

Further, preferably, a force sensor may be mounted on the foot.

Advantageous Effects

In accordance with the present invention, it is possible to switch between a leg mode and a wheel mode, so a robot operates in the wheel mode on terrain where it can move quickly, and operates in the leg mode on terrain where it cannot travel in the wheel mode, allowing the robot to move across various terrains.

In addition, in accordance with the present invention, it is possible to stably perform driving on regular or unstructured roads, avoiding obstacles, and driving on curved roads by respectively controlling various motors mounted on the robot.

Further, in accordance with the present invention, it is possible to prevent objects loaded on a main body of the robot from tipping over by considering dynamic behavior during the acceleration/deceleration movement of the robot.

DESCRIPTION OF DRAWINGS

FIG. 1 is a perspective view illustrating the overall configuration of a hybrid robot switchable in a leg mode and a wheel mode according to a first embodiment of the present invention.

FIG. 2 illustrates an exploded perspective view of a portion of the configuration in the state shown in FIG. 1.

FIG. 3 illustrates a sectional view of FIG. 1 taken along line A-A'.

FIG. 4 illustrates a perspective view of the left moving part according to the first embodiment of the present invention viewed obliquely from the right.

FIG. 5 illustrates a perspective view of the left moving part shown in FIG. 4 viewed obliquely from the left.

FIG. 6 illustrates an exploded perspective view of constructions coupled to the second links according to the first embodiment of the present invention.

FIG. 7 is a perspective view illustrating the overall configuration of a hybrid robot switchable in a leg mode and a wheel mode according to a second embodiment of the present invention.

FIG. 8 illustrates an exploded perspective view of a portion of the configuration in the state shown in FIG. 7.

FIG. 9 illustrates an exploded perspective view of constructions coupled to second links according to the second embodiment of the present invention.

FIG. 10*a* illustrates a station mode, FIG. 10*b* illustrates a leg mode, and FIG. 10*c* illustrates a wheel mode.

FIG. 11 illustrates the operation state of the robot in a leg mode.

FIGS. 12*a* to 12*e* illustrate the operation state of the robot in the wheel mode.

FIG. 13 illustrates a modified embodiment of the main body according to the present invention.

BEST MODE

Hereinafter, a moving part switchable in a leg mode and a wheel mode and a hybrid robot having the same according to a preferred embodiment will be described in detail with reference to the attached drawings. Here, the same symbols are used for the same components, and repetitive descriptions and detailed descriptions of known functions and configurations that may unnecessarily obscure the gist of the invention are omitted. Embodiments of the invention are provided to more completely explain the present invention to those with average knowledge in the art. Therefore, the shapes and sizes of elements in the drawings may be exaggerated for clearer explanation.

<Configuration According to First Embodiment of Present Invention>

FIG. 1 is a perspective view illustrating the overall configuration of a hybrid robot switchable in a leg mode and a wheel mode according to a first embodiment of the present invention, FIG. 2 illustrates an exploded perspective view of a portion of the configuration in the state shown in FIG. 1, and FIG. 3 illustrates a sectional view of FIG. 1 taken along line A-A'.

As shown in FIG. 1, the hybrid robot switchable in a leg mode and a wheel mode according to the first embodiment of the present invention includes a main body 100, a left moving part 200 and a right moving part 300. When comparing the hybrid robot according to the present invention to the human body, the main body 100 may correspond to the torso, and the moving parts 200 and 300 may correspond to the legs. Here, there is no limit to the number of the moving parts 200 and 300, but in this specification, it is explained that there are two moving parts 200 and 300 on the left and right based on the main body 100.

In the first embodiment of the present invention, the main body 100 includes a body 101 having an internal space, a body cover 103 for opening/closing an opening formed in the body 101, and a hip cover 110 mounted on a lower part of the body 101. Objects, etc. may be accommodated in the internal space of the body 101. The body cover 103 includes a glass 104, so the internal space of the body 101 can be seen.

Meanwhile, the above-described main body 100 is only an example, and may be modified into various forms as long as it can load people, objects, etc.

On the main body 100, a network device for communication between the hybrid robot according to the present invention and the outside or for internal communication within the hybrid robot; and a controller for processing communication signals may be mounted. The network device may use various known industrial network protocols such as EtherCAT and CAN.

Meanwhile, the controller may process internal and external communication as well as signals from various sensors mounted on the robot. In addition, the controller may control the operations of the moving parts in a station mode, a leg mode, a wheel mode, etc., which will be described below.

In addition, a battery for driving the hybrid robot according to the present invention is built in the main body.

The hip cover 110 may correspond to the hip area of the human body. A frame 112 is mounted inside the hip cover 110. Referring to FIG. 3, the frame 112 is fixed to an upper side of the hip cover 110. However, the frame 112 may be mounted on the hip cover 110 without any particular location restrictions.

Two yaw motors 115 are mounted on the frame 112 on the left and right direction of the frame 112. The yaw motors 115 are motors that rotate in a yaw direction around yaw axis z. A roll motor 116 is mounted on a rotation part of each of the yaw motors 115. The roll motor 116 is a motor that rotates in a roll direction around a roll axis x. On the rotation part of the roll motor 116, a pitch motor 118 is mounted. The pitch motor 118 is a motor that rotates in a pitch direction around a pitch axis y. Here, a motor bracket 117 for connecting the roll motor 116 and the pitch motor 118 to each other is used.

Meanwhile, the moving parts 200 and 300 may rotate around at least one of the three axes x, y and z by the above-described yaw motor 115, roll motor 116 and pitch motor 118.

Each of the moving parts 200 and 300 is connected to the rotation part of the pitch motor 118. In the present invention, the configuration of the left moving part 200 is the same as that of the right moving part 300. Therefore, in this specification, the description will focus on the left moving part 200 for convenience of explanation.

FIG. 4 illustrates a perspective view of the left moving part according to the first embodiment of the present invention viewed obliquely from the right, and FIG. 5 illustrates a perspective view of the left moving part shown in FIG. 4 viewed obliquely from the left.

The left moving part 200 may assume a posture rotated in a specific direction by receiving the rotational movement of the yaw motors 115, the roll motor 116 and the pitch motor 118. The left moving part 200 includes a first link 210, second links **250*a* and 250*b***, a joint motion means and a wheel motion means.

The pitch motor 118 is connected between one side and the other side of the first link 210. As shown in FIGS. 1 and 2, the first link 210 is formed in the roll axis (x) direction to be connected to the pitch motor 118. The first link 210 may correspond to the thigh of the human body.

The second links **250*a* and 250*b* are located below the first link 210 and connected to a first joint motion rod 223 and a wheel motion rod 243 which will be described below. Accordingly, when the first link 210 rotates, the second links 250*a* and 250*b* also rotate in the same direction in conjunction with the rotation. The second links 250*a* and 250*b* are composed of two pieces and are coupled while facing each other. Here, a spacer 249 is mounted to maintain a gap between the second links 250*a* and 250*b***.

A joint motion means is connected to one side of the first link 210. The joint motion means perform movements similar to those of the human leg and includes a first joint driving motor 220, link mount parts 221 and 222, a first joint motion rod 223 and a foot 225.

The first joint driving motor 220 is mounted on one side of the first link 210. Accordingly, when the first link 210 rotates, the first joint driving motor 220 may also move along a rotation path of the first link 210. An axial magnetic flux motor may be used as the first joint driving motor 220. The first joint driving motor 220 may correspond to the knee joint of the human body.

The link mount parts 221 and 222 are connected to one side of the first link 210. The link mount parts 221 and 222 are composed of a link mount 221 and a link mount cover 222, and the link mount 221 and the link mount cover 222 are coupled to each other while facing each other. Here, the link mount parts 221 and 222 are coupled with each other with one side of the first link 210 therebetween.

As shown in FIGS. 4 and 5, one end of the link mount cover 222 is connected to the rotation part of the first joint driving motor 220, and one end of the link mount 221 is connected to an opposite side of the rotation part of the first joint driving motor 220. Accordingly, when the first joint driving motor 220 is driven, the link mount parts 221 and 222 rotate together as the first joint driving motor 220 rotates. Meanwhile, in another embodiment, one end of the link mount 221 may be connected to the rotation part of the first joint driving motor 220, and one end of the link mount cover 222 may be connected to an opposite side of the rotation part of the first joint driving motor 220.

One end of the first joint motion rod 223 is fixedly connected to the link mount parts 221 and 222, and the other end thereof is rotatably connected to one side of each of the second links **250*a* and 250*b*. Here, a joint 224 is formed at the other end of the first joint motion rod 223 for connection with the second links 250_a_ and 250_b_. The first joint motion rod 223** may correspond to the lower leg of the human body, and the other end thereof may correspond to the ankle of the human body.

The foot 225 is rotatably connected to the other end of the first joint motion rod 223. Here, one side of each of the second links 250_a_ and 250_b_ connected to the first joint motion rod 223 and the foot 225 have the same central axis. A point connected to the first joint motion rod 223 on the foot 225 is referred to as a first point. The foot 225 may correspond to a human foot.

Meanwhile, the joint motion means according to the present invention further includes a second joint driving motor 230 and a second joint motion rod 233 to operate the foot 225.

The second joint driving motor 230 is mounted on the link mount parts 221 and 222. Accordingly, when the link mount parts 221 and 222 rotate, the second joint driving motor 230 may also move along a rotation path of the link mount parts 221 and 222. As the second joint driving motor 230, an axial magnetic flux motor may be used. Meanwhile, there is no limit to the mounting position of the second joint driving motor 230 so long as the foot 225 can be operated.

Meanwhile, as shown in FIGS. 4 and 5, a third link 235 is used to connect the second joint driving motor 230 with the second joint motion rod 233. Here, one end of the third link 235 is connected to a rotation part of the second joint driving motor 230, and the other end thereof is rotatably connected to one end of the second joint motion rod 233. The other end of the second joint motion rod 233 is rotatably connected to the foot 225. Here, a point connected to the second joint motion rod 233 on the foot 225 is referred to as a second point. The second point on the foot 225 is located a certain distance away from the first point. In the present invention, the second point is formed in front of the first point, but, in another embodiment, the first point may be formed in front of the second point.

FIG. 6 illustrates an exploded perspective view of constructions coupled to the second links according to the first embodiment of the present invention.

Meanwhile, a wheel motion means is connected to the other side of the first link 210. The wheel motion means includes a wheel motion rod 243, a wheel 247 and a wheel-driving motor 240.

Opposite ends of the wheel motion rod 243 are rotatably connected to the other side of the first link 210 and the other side of each of the second links 250_a_ and 250_b_, respectively. Here, joints 244 and 245 are respectively formed at opposite ends of the wheel motion rod 243.

The wheel shaft 248 is inserted into the center of the wheel 247, thereby being rotatably connected with the second link 250_b_. Here, the other side of each of the second links 250_a_ and 250_b_ and the wheel 247, which are connected to the wheel motion rod 243, have the same central axis through the wheel shaft 248. Meanwhile, in the present invention, the wheel 247 may be formed on one side of one second link 250_b_ of the two second links 250_a_ and 250_b_, formed on the opposite side of the other second links 250_a_, and formed between the two second links 250_a_ and 250_b_.

The wheel-driving motor 240 is provided to drive the wheel 247 and mounted on the second links 250_a_ and 250_b_. As the wheel-driving motor 240, a Blushless DC (BLDC) motor may be used, but, without being limited thereto, various types of known motors may be used.

Meanwhile, in the first embodiment of the present invention, the wheel-driving motor 240 includes a pulley 242 and a belt 241 to drive the wheel 247. Referring to FIG. 6, the pulley 242 is fixedly mounted on the wheel 247. In addition, a drive shaft of the wheel-driving motor 240 and the pulley 242 are connected to the belt 241. Accordingly, when the wheel-driving motor 240 is driven, the wheel 247 rotates by the belt 241 and the pulley 242.

Meanwhile, after the joint motion means and the wheel motion means are coupled to the first link 210 and the second links 250_a_ and 250_b_, a link cover 260 is mounted on the first link 210.

Meanwhile, in the first embodiment of the present invention, the first joint driving motor 220, the second joint driving motor 230 and the wheel-driving motor 240 are motors rotating around the pitch axis y.

Meanwhile, in the present invention, the joint motion means is located at the front, and the wheel motion means is located at the rear. However, according to a modified embodiment, the wheel motion means may be located at the front, and the joint motion means may be located at the rear.

Meanwhile, a force sensor capable of sensing force or torque when the moving part described in the present invention is moving or stationary may be mounted. In the present invention, the force-torque (FT) sensor may be mounted on the foot 225. Here, the type of a force sensor and the mounting location thereof are not limited.

In addition, various sensors for sensing external environmental information, particularly a sensor, such as a camera and a vision sensor, for sensing visual information, a sensor for measuring the distance to an obstacle, a sensor for detecting external shock, or a hearing sensor, acceleration sensor or Inertial Measurement Unit (IMU) sensor necessary for driving a robot, may be mounted on the main body or moving part of the hybrid robot according to the present invention.

<Configuration According to Second Embodiment of Present Invention>

FIG. 7 is a perspective view illustrating the overall configuration of a hybrid robot switchable in a leg mode and a wheel mode according to a second embodiment of the present invention, FIG. 8 illustrates an exploded perspective view of a portion of the configuration in the state shown in FIG. 7, and FIG. 9 illustrates an exploded perspective view of constructions coupled to second links according to the second embodiment of the present invention.

In the hybrid robot switchable in a leg mode and a wheel mode according to the second embodiment of the present invention, the configuration of a moving part is slightly different from the above-described first embodiment. Accordingly, a description will be focused on the difference from the first embodiment.

As shown in FIG. 7, the hybrid robot switchable in a leg mode and a wheel mode according to the second embodiment of the present invention includes a main body 100, a left moving part 1200 and a right moving part 1300. Also in the second embodiment as in the description of the first embodiment, a description will be focused on the left moving part 1200.

The left moving part 1200 includes a first link 1210, second links 1250_a_ and 1250_b_, a joint motion means and a wheel motion means.

Among joint motion means according to the second embodiment, two third links 1235 and two second joint motion rods 1233_a_ and 1233_b_ are connected to a second joint driving motor 1230. Here, the second joint motion rods 1233_a_ and 1233_b_ are formed on opposite sides of a first joint motion rod 1223. One of the third links 1235 is rotatably connected to a link mount 1221.

Referring to FIG. 9, among wheel motion means according to the second embodiment, a rotation part of a wheel-driving motor 1240 for driving a wheel 1247 is fixedly mounted on the wheel 1247. Accordingly, unlike in the first embodiment, there is no need for components such as a pulley and a belt to drive the wheel 1247. Here, the position of the wheel-driving motor 1240 is the same as described in the first embodiment.

<Operation Control Mode of Present Invention>

FIG. 10*a* illustrates a station mode, FIG. 10*b* illustrates a leg mode, and FIG. 10*c* illustrates a wheel mode.

The hybrid robot according to the present invention switchable in a leg mode and a wheel mode includes a station mode, a leg mode and a wheel mode.

As shown in FIG. 10*a*, in a station mode, the first link 210 or 1210 remains parallel to the ground, and the foot 225 or 1225 and the wheel 247 or 1247 can both touch the ground, so the robot can stand stably. That is, the station mode is a mode required when the robot needs to stop at a specific location.

As shown in FIG. 10*b*, in a leg mode, the first link 210 or 1210 is rotated in one direction (counterclockwise in FIG. 10*b*) such that the foot 225 or 1225 moves downward and the wheel 247 or 1247 moves upward. In the leg mode, the robot may move while performing joint movements. In the present invention, when operating in a leg mode, the robot is bipedal and can walk or run. The leg mode is a mode required when moving on terrain that cannot be operated in a wheel mode. For example, in irregular terrain conditions such as stairs, the robot can more stably operate in a leg mode than a wheel mode. A robot operation process in the leg mode will be described below.

As shown in FIG. 10*c*, In the wheel mode, the first link 210 or 1210 is rotated in the other direction (clockwise in FIG. 10) such that the wheel 247 or 1247 moves downward and the foot 225 or 1225 moves upward. In the wheel mode, the robot may move while making wheel movements. In the wheel mode, the robot may move at a faster speed than in the leg mode. A robot operation process in the wheel mode will be described below.

As an example of switching between the three motion control modes described above, while the robot is moving from a current point to a target point, the robot moves at high speed in a wheel mode when moving on regular terrain and is switched to a leg mode when moving on irregular terrain, and, when reached to the target point, the robot may be switched to a station mode and stop.

<Operation Control Process of Present Invention>

FIG. 11 illustrates the operation state of the robot in a leg mode.

First, referring to FIG. 11, the operation process of the robot in a leg mode is described. When the station mode is switched to the leg mode, the pitch motor 118 rotates in one direction so that the first link 210 or 1210 also rotates. Here, the wheel 247 or 1247 comes off the ground while the other side of each of the first link 210 or 1210 and the second links 250*a* and 250*b* or 1250*a* and 1250*b* moves upward. Next, the pitch motor 118 and the first joint driving motor 220 on the left and right sides are controlled to be driven alternately to perform joint movements of the robot. Here, when the second joint driving motor 230 is controlled to drive, the tip of the foot 225 or 1225 goes up or down, and the angle at which the foot 225 or 1225 touches the ground can be adjusted.

If a path that rotates to the left or right appears, the yaw motors 115 may be controlled to drive by a required rotation angle so that the robot turns left or right in a desired direction.

If an obstacle appears on a movement path while the robot is operating in the leg mode, it can be avoided by operating the above-described yaw motors 115. Alternatively, if the roll motor 116 is driven such that the moving parts 200 and 300 are apart from each other, the obstacle passes between the left and right moving parts 200 and 300.

FIGS. 12*a* to 12*e* illustrate the operation state of the robot in the wheel mode.

Next, the operation process of the robot in the wheel mode is described with reference to FIGS. 12*a* to 12*e*. When switching from the station mode or the leg mode to the wheel mode, the pitch motor 118 rotates in another direction, so the first link 210 or 1210 also rotates. Here, as the other side of each of the first link 210 or 1210 and the second links 250*a* and 250*b* or 1250*a* and 1250*b* moves downward, the wheel 247 or 1247 touches the ground, and the foot 225 or 1225 comes off from the ground. Next, when the wheel-driving motor 240 or 1240 is controlled to be driven, the wheel movement of the robot is performed while the wheel 247 or 1247 rotates.

FIG. 12*a* illustrates a state in which the robot turns right when operating in the wheel mode. Referring to FIG. 12*a*, when the robot encounters a right turn course while driving in the wheel mode, the first link 210 or 1210 of the left moving part 200 is rotated in the other direction through the pitch motor 118 to lengthen the length of the left moving part 200, and if the length of the right moving part 300 is shortened by rotating the first link of the right moving part 300 in one direction, the robot turns right. An ordinary technician can easily understand that a robot turns left using this same principle.

FIG. 12*b* illustrates that the effect of active suspension is exhibited by controlling the motor rotation of the left and right moving parts 200 and 300 respectively according to an uneven shape when the robot passes through uneven terrain when driving in the wheel mode.

FIG. 12*c* illustrates a state in which the motor rotation of the left and right moving parts 200 and 300 is respectively controlled when the height of the terrain passing by the left moving part 200 is different from the height of the terrain passing by the right moving part 300 when the robot is driving in the wheel mode.

FIG. 12*d* illustrates the rotation control of the main body 100 when the robot accelerates or decelerates while driving in the wheel mode. When the robot suddenly accelerates or decelerates, the main body 100 may fall or a load contained inside the main body 100 may be tilted in one direction. Accordingly, in the present invention, the rotation of the main body 100 may be controlled to prevent the load stored inside the main body 100 from tilting by determining whether the robot accelerates or decelerates when driving in the wheel mode.

FIG. 12*e* illustrates a state in which the robot avoids an obstacle when driving in the wheel mode. As shown in FIG. 12*e*, when an obstacle appears on the robot's movement path, the roll motor 116 is driven such that the left and right moving parts 200 and 300 are spaced apart, so the obstacle passes between the left and right moving parts 200 and 300.

Meanwhile, the robot's operation in the leg mode and wheel mode described above is only an example, and various modified movements are possible by utilizing the motor mounted on the present invention.

In summary, the hybrid robot switchable in a leg mode and a wheel mode according to the present invention is capable of moving on various terrains such as flat land, sloped terrain, curved terrain, and uneven terrain, and switching to and moving in a mode suitable for each terrain.

FIG. 13 illustrates a modified embodiment of the main body according to the present invention.

Meanwhile, as shown in FIG. 13, the main body 100 may be configured in a module form, and may be formed by stacking and combining multiple main bodies 100.

The present invention has been described with reference to an embodiment shown in the attached drawings, but this is merely illustrative, and those skilled in the art will recognize that various modifications and other equivalent embodiments are possible therefrom. Therefore, the true scope of protection of the present invention should be determined only by the appended claims.

The invention claimed is:

1. A hybrid robot switchable in a leg mode and a wheel mode, the hybrid robot comprising:
- a main body; and
- a moving part movable in a state of being rotated in at least one direction of roll, pitch, and yaw directions by a motor mounted on the main body,
- wherein the moving part comprises:
  - a first link rotatably connected to the main body through a portion between one side of the first link and another side thereof;
  - second links located below the first link and configured to rotate in an identical direction in conjunction with rotation of the first link;
  - a joint motion means connected to one side of each of the first and second links; and
  - a wheel motion means connected to another side of each of the first and second links,
- wherein the joint motion means comprises:
  - a first joint driving motor mounted on one side of the first link;
  - link mount parts connected to be rotated by the first joint driving motor;
  - a first joint motion rod whose one end is fixedly connected to the link mount parts and whose other end is rotatably connected to one side of the second links; and
  - a foot rotatably connected to another end of the first joint motion rod, and
- wherein the moving part operates together with the motor mounted on the main body, the moving part is operated by the joint motion means in the leg mode, and the moving part is operated by the wheel motion means in the wheel mode.

2. The hybrid robot according to claim 1, wherein the main body comprises:
- yaw motors;
- a roll motor mounted on a rotation part of each of the yaw motors; and
- a pitch motor mounted on a rotation part of the roll motor and configured to rotate the first link.

3. The hybrid robot according to claim 2, wherein a frame for fixing the yaw motors is mounted on the main body.

4. The hybrid robot according to claim 2, wherein the pitch motor is connected to the roll motor by a motor bracket so as to have a pitch direction rotation axis.

5. The hybrid robot according to claim 1, wherein the first joint motion rod and the foot have an identical central axis and are connected to one side of the first link.

6. The hybrid robot according to claim 1, wherein the joint motion means further comprises:
- a second joint driving motor mounted on the link mount parts;
- a third link connected to be rotated by the second joint driving motor; and
- a second joint motion rod whose one end is rotatably connected to the third link and whose other end is rotatably connected to the foot.

7. The hybrid robot according to claim 6, wherein the first joint motion rod is connected to a first point of the foot, and the second joint motion rod is connected to a second point, located a certain distance away from the first point, of the foot.

8. The hybrid robot according to claim 1, wherein the wheel motion means comprises:
- a wheel motion rod whose opposite ends are rotatably connected to other ends of the first and second links;
- a wheel rotatably connected to other ends of the second links; and
- a wheel-driving motor for driving the wheel.

9. The hybrid robot according to claim 8, wherein the wheel motion rod and the wheel have an identical central axis and are connected to other ends of the second links.

10. The hybrid robot according to claim 8, wherein the wheel motion means further comprises:
- a pulley fixed to the wheel; and
- a belt connected to the pulley and configured to be rotated by the wheel-driving motor.

11. The hybrid robot according to claim 8, wherein the wheel-driving motor and the wheel have an identical central axis and the wheel-driving motor is mounted on the wheel.

12. The hybrid robot according to claim 8, wherein two second links are comprised in a posture facing each other, and a spacer is mounted between the second links.

13. The hybrid robot according to claim 1, wherein, in a station mode, the first and second links are rotated parallel to ground such that the moving part is stationary.

14. A moving part for a hybrid robot switchable in a leg mode and a wheel mode, the moving part comprises:
- a first link;
- second links located below the first link and configured to rotate in an identical direction in conjunction with rotation of the first link;
- a joint motion means connected to one side of each of the first and second links; and
- a wheel motion means connected to another side of each of the first and second links,
- wherein the joint motion means comprises:
  - a first joint driving motor mounted on one side of the first link;
  - link mount parts connected to be rotated by the first joint driving motor;
  - a first joint motion rod whose one end is fixedly connected to the link mount parts and whose other end is rotatably connected to one side of the second links; and
  - a foot rotatably connected to another end of the first joint motion rod, and
- wherein the moving part is operated by the joint motion means in the leg mode, and the moving part is operated by the wheel motion means in the wheel mode.

15. The moving part according to claim 14, wherein the first joint motion rod and the foot have an identical central axis and are connected to one side of the first link.

16. The moving part according to claim 14, wherein the joint motion means further comprises:

a second joint driving motor mounted on the link mount parts;

a third link connected to be rotated by the second joint driving motor; and two second joint motion rods, wherein one end of each of the second joint motion rods is rotatably connected to the third link and another end thereof is rotatably connected to the foot.

17. The moving part according to claim 16, wherein the first joint motion rod is connected to a first point of the foot, and a second joint motion rod from among the second joint motion rods is connected to a second point, located a certain distance away from the first point, of the foot.

18. The moving part according to claim 16, wherein the second joint motion rods are formed on opposite sides of the first joint motion rod so that the first joint motion rod is placed between the second joint motion rods.

19. The moving part according to claim 18, wherein two second links are comprised in a posture facing each other, and a spacer is mounted between the second links.

20. The moving part according to claim 14, wherein the wheel motion means comprises:

a wheel motion rod whose opposite ends are rotatably connected to other ends of the first and second links;

a wheel rotatably connected to other ends of the second links; and a wheel-driving motor for driving the wheel.

21. The moving part according to claim 20, wherein the wheel motion rod and the wheel have an identical central axis and are connected to other ends of the second links.

22. The moving part according to claim 20, wherein the wheel motion means further comprises:

a pulley fixed to the wheel; and a belt connected to the pulley and configured to be rotated by the wheel-driving motor.

23. The moving part according to claim 20, wherein the wheel-driving motor and the wheel have an identical central axis and the wheel-driving motor is mounted on the wheel.

24. The moving part according to claim 14, wherein a force sensor is mounted on the foot.

* * * * *